United States Patent [19]

Saligny

[11] Patent Number: 5,509,066

[45] Date of Patent: Apr. 16, 1996

[54] TELEPHONE DISTRIBUTION FRAME ELEMENT, IN PARTICULAR A CONNECTION STRIP

[76] Inventor: Yves Saligny, Rond Point des Lacs Thyez, 74300 Cluzes, France

[21] Appl. No.: 295,666

[22] PCT Filed: Mar. 3, 1993

[86] PCT No.: PCT/FR93/00216

§ 371 Date: Aug. 29, 1994

§ 102(e) Date: Aug. 29, 1994

[87] PCT Pub. No.: WO93/18621

PCT Pub. Date: Sep. 16, 1993

[30] Foreign Application Priority Data

Mar. 3, 1992 [FR] France .................................. 92 02501

[51] Int. Cl.$^6$ .............................. H04M 3/00; H05K 7/16; H05K 5/00; H01R 29/00
[52] U.S. Cl. .......................... 379/327; 361/725; 361/727; 361/730; 361/733; 361/796; 361/799; 361/803; 361/824; 379/329; 379/331; 439/49; 439/61
[58] Field of Search ..................................... 379/325, 326, 379/327, 328, 329, 330, 331, 332; 361/729, 730, 733, 785, 788, 796, 797, 799, 803, 823, 824, 725, 727; 439/43, 49, 61

[56] References Cited

U.S. PATENT DOCUMENTS 4,729,064  3/1988  Singer, Jr. ............................. 379/332 X

FOREIGN PATENT DOCUMENTS

| 0316259A2 | 5/1989 | European Pat. Off. . |
| 0364658A2 | 4/1990 | European Pat. Off. . |
| 2660508A1 | 10/1991 | France . |
| 2156604 | 10/1985 | United Kingdom . |

*Primary Examiner*—Jeffery Hofsass
*Assistant Examiner*—Harry S. Hong
*Attorney, Agent, or Firm*—Sughrue, Mion, Zinn, Macpeak & Seas

[57] ABSTRACT

A telephone distribution frame element, of the type including firstly a plurality of input connectors (14E) and output connectors (14S) disposed in rows, and secondly at least one filtering and/or protection module (17) to be inserted between the input connectors (14E) and the output connectors (14S), with channels (16) suitable for guiding the corresponding link wires being associated with the output connectors (14S). According to the invention, the channels (16) associated with the output connectors (14S) in the same row (20) are grouped together inside a guide plate (21) which extends on edge and in alignment with the row (20), and each of the rows (20) of input connectors (14E) and output connectors (14S) aligned in this way with the guide plates (21) is flanked on one side by a passage (22) in which a filtering and/or protection module (17) can extend. Application, in particular, to connection strips.

15 Claims, 3 Drawing Sheets

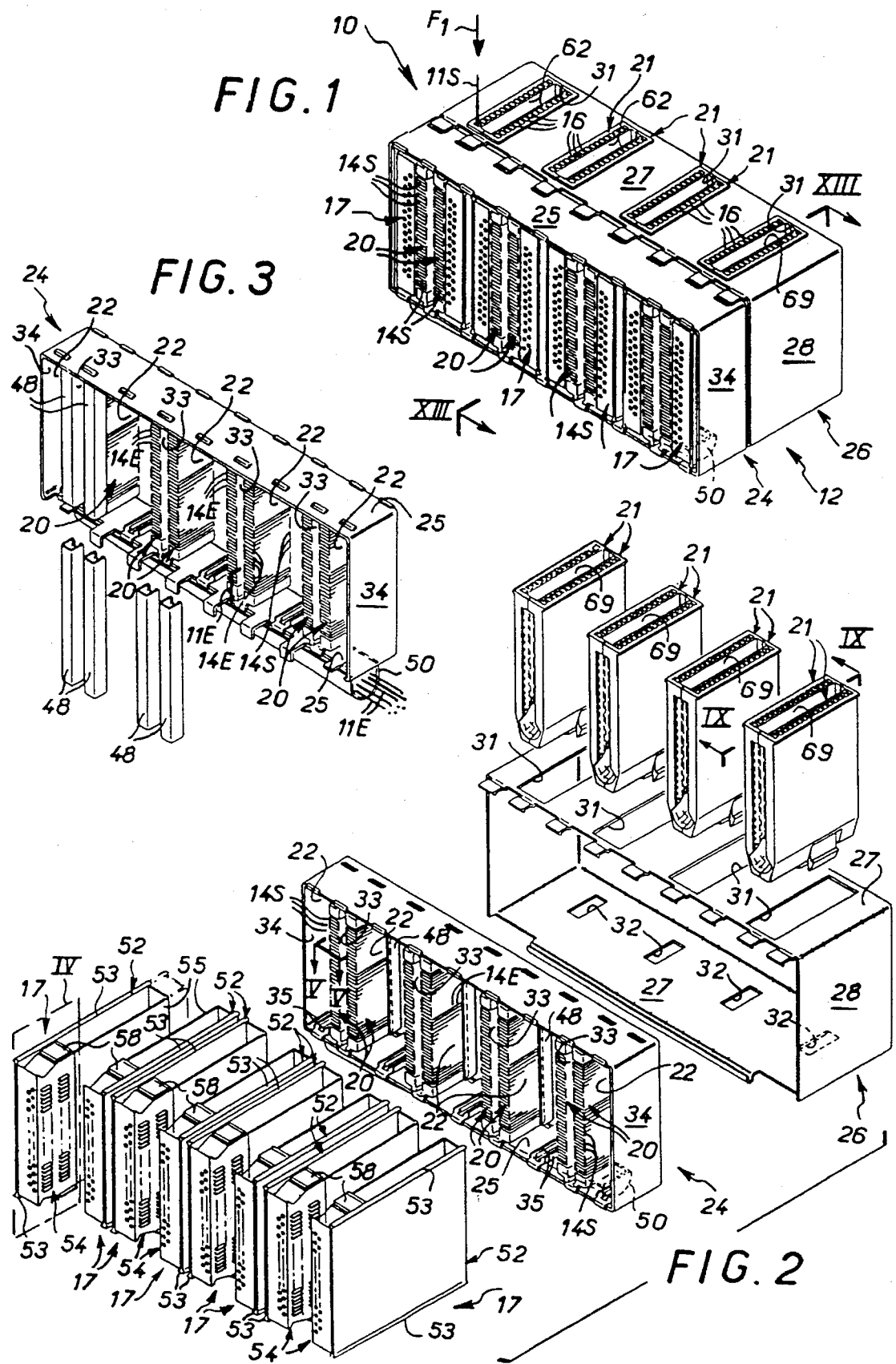

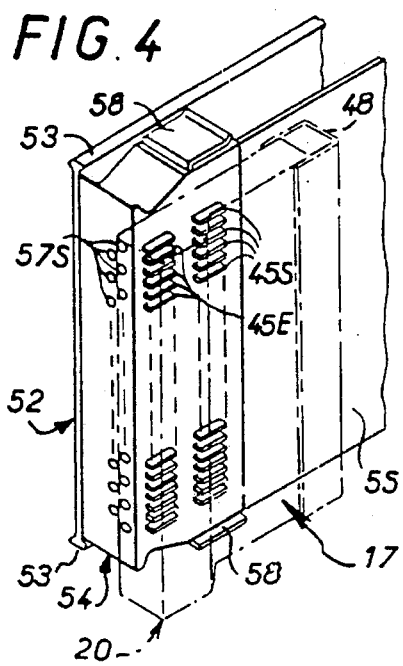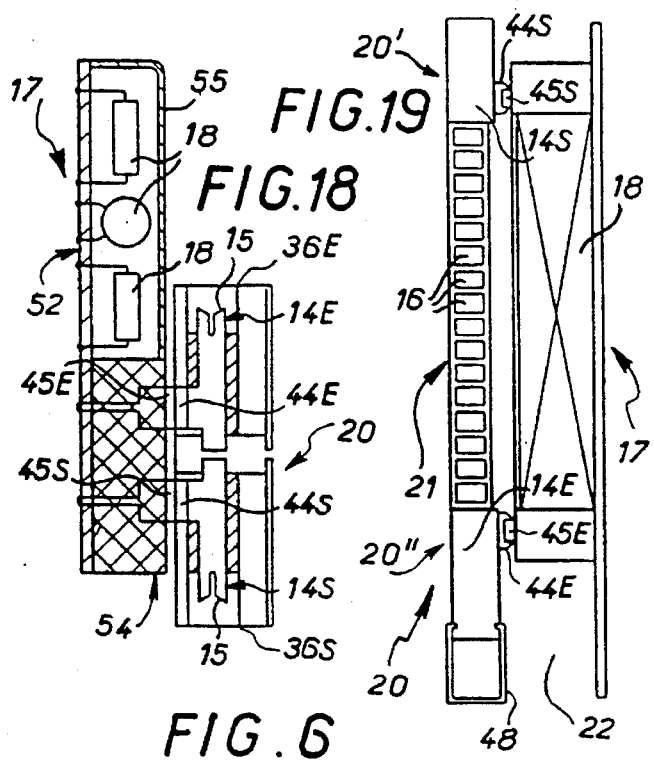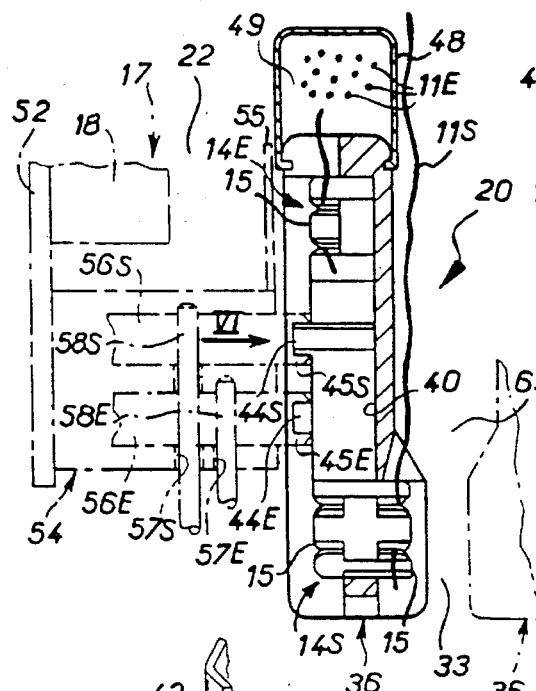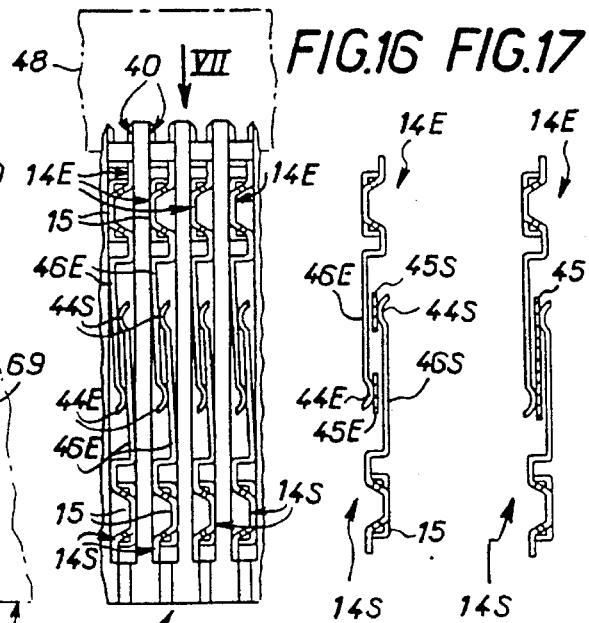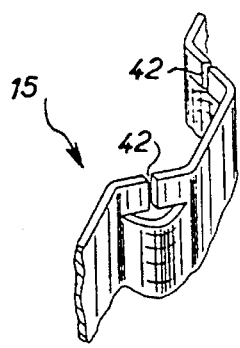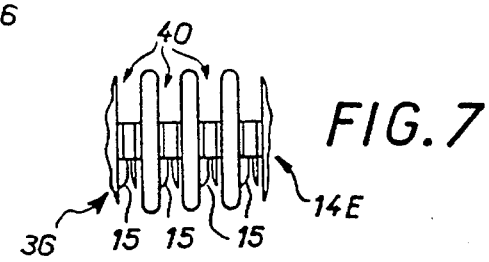

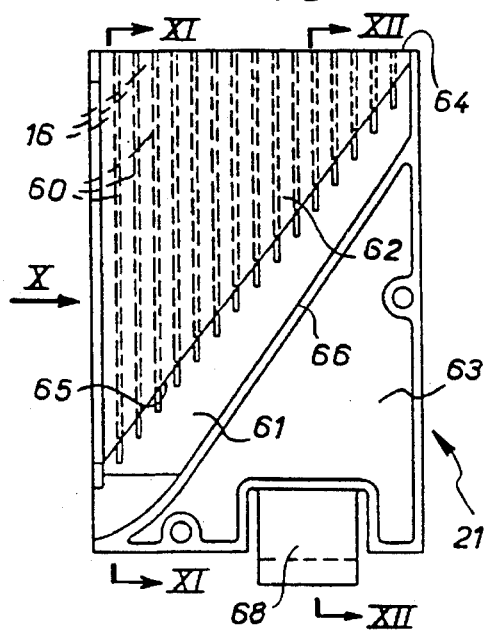
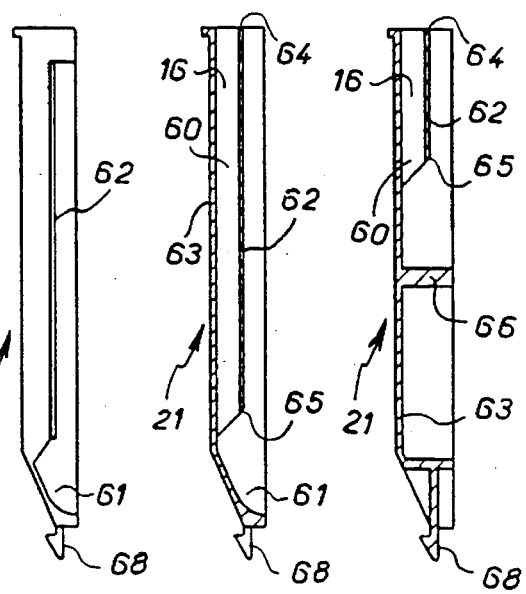
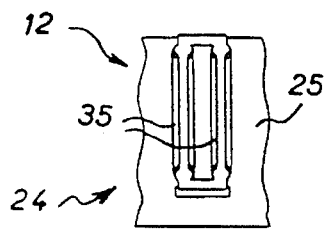
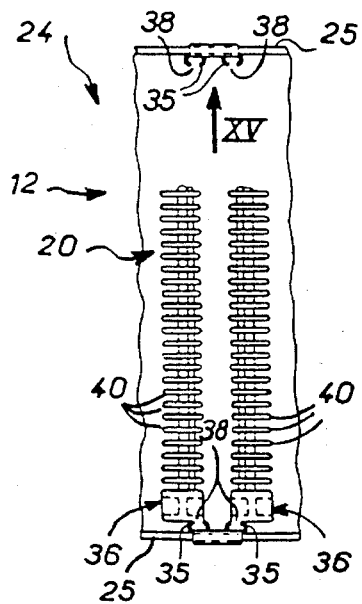
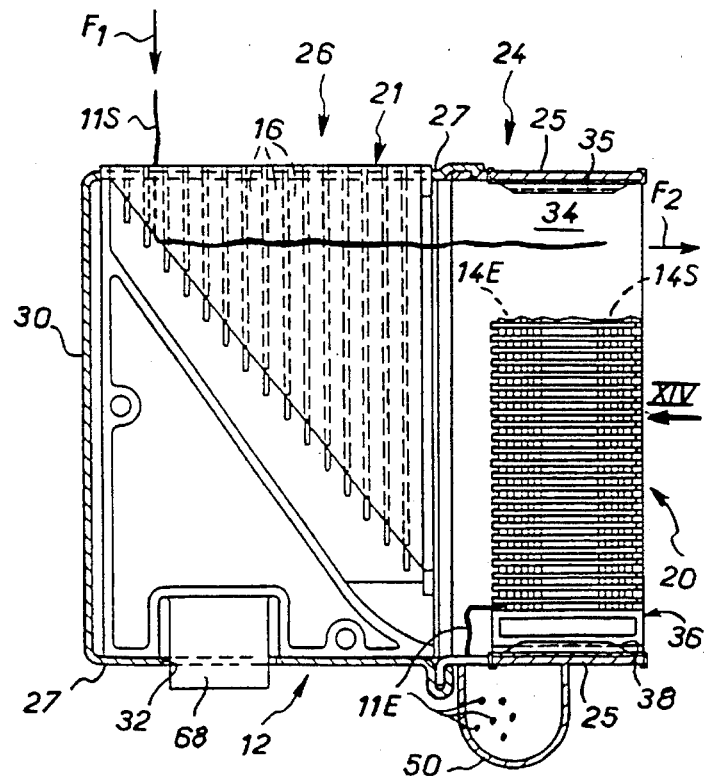

TELEPHONE DISTRIBUTION FRAME ELEMENT, IN PARTICULAR A CONNECTION STRIP

FIELD OF THE INVENTION

The present invention relates to telephone distribution frames.

BACKGROUND OF THE INVENTION

It is well known that telephone distribution frames currently usually include two types of elements, which constitute the essential elements thereof, namely, firstly, "cable heads" into which the subscriber cables, with their many constituent wires, are received in a given geographical distribution pattern, and, secondly, "connection strips" which distribute the subscriber cables in number order, and from which go the cables connecting the assembly to the automatic exchange in question, with link wires commonly referred to as "jumpers" being disposed between these elements.

Filtering and/or protection components are also provided.

Currently, such filtering and/or protection components are disposed in the cable heads of the distribution frame, and on the subscriber cards of the automatic exchange.

The connection strips of the distribution frame are currently usually mere connection terminal strips and are free from any filtering and/or protection component.

However, in order to be able to increase the capacity of automatic exchanges, for a given volume, it is now necessary to move the filtering and/or protection components from the subscriber cards to the distribution frame.

Therefore, consideration is now being given to inserting such filtering and/or protection components into the connection strips of the distribution frame, as is already the case for the cable heads.

With respect to a cable head, in the French Patent filed on Oct. 31, 1978 under No. 78 30896 and published under No. 2 440 636, the connectors to be implemented are disposed in rows, each connector having at least one connection terminal. The connectors constitute input connectors for connection to the incoming wires, and output connectors, respectively aligned with the input connectors, for connection to the link wires. At least one filtering and/or protection module is associated with the connectors, which module carries at least one arbitrary filtering and/or protection component to be inserted between the connection terminal of an input connector and the connection terminal of the corresponding output connector, and channels suitable for guiding the link wires are associated with the connectors.

In practice, in that French Patent No. 78 30896, the input connectors and the output connectors in the same row extend in the same plane, over the inside face of one of the walls of a modular connection block, over the outside face of which extend associated guide channels. The guide channels are all distinct from one another, and each channel has an approximately 90° bend between its input and its output. The filtering and/or protection modules implemented are in the form of drawers, which, for the purposes of co-operating with the connectors, have contact blades on the bottom surface of their bases, so that the electrical connections between the filtering and/or protection modules and the connectors are achieved by means of pad-type contacts.

Given its overall configuration, and unless its overall size were to be so large as to be prohibitive, such a distribution frame element would not be suitable when, as in the present case, it is necessary to equip connection strips with all or some of the filtering and/or protection components that are usually present on the subscriber cards in the automatic exchange.

An overall object of the present invention is to provide a configuration that would be satisfactory in that case, while also being suitable for cable heads.

SUMMARY OF THE INVENTION

More precisely, the invention provides a telephone distribution frame element of the type including, regardless of whether it is a cable head or a connection strip, firstly a plurality of connectors disposed in rows, each connector having at least one connection terminal, namely input connectors for connection to incoming wires, and output connectors, aligned respectively with said input connectors, for connection to link wires, and secondly at least one filtering and/or protection module carrying at least one arbitrary filtering and/or protection component to be inserted between the connection terminal of an input connector and the connection terminal of the corresponding output connector, with channels suitable for guiding the link wires being associated with the output connectors, said telephone distribution frame element being generally characterized in that the channels associated with the output connectors in the same row are grouped together inside a guide plate which extends on edge and in alignment with the row, and in that each of the rows of connectors aligned in this way with the guide plates is flanked on one side by a passage in which a filtering and/or protection module can extend.

In other words, in accordance with a first characteristic of the invention, the filtering and/or protection modules implemented pass through the connectors.

Advantageously, as a result, the assembly is extremely compact, thereby making it possible to receive the various filtering and/or protection components to be housed.

Implementation is advantageously easy both during installation and while in service.

In particular, in accordance with an additional characteristic of the invention, it is advantageously possible to provide sockets, suitable for receiving test pins, in the front of the filtering and/or protection modules.

It is thus possible to conduct tests on the subscriber lines without it being necessary firstly to remove the corresponding filtering and/or protection module(s).

Also as result of the configuration of the invention, it is possible, if desired, to replace one filtering and/or protection module with another one very quickly, or to replace such a filtering and/or protection module with connectors, so as to increase the capacity of the assembly, if no filtering or protection is required locally.

Finally as a result of the configuration of the invention, it is possible, if desired, to pre-wire the incoming cables in the workshop by equipping their ends with the connection members that are required for connecting them to the automatic exchange, so as to shorten the subsequent on-site installation time.

Preferably, the connection terminal on each of the connectors of the telephone distribution frame element of the invention is electrically connected to a contact tab which projects transversely towards the corresponding passage, and the filtering and/or protection module is in turn provided with a corresponding transversely-projecting contact tab for each of the connectors, which contact tab is suitable for making contact with the contact tab on the connector.

In this way, in accordance with an additional characteristic of the invention, the electrical connection between the connectors and the filtering and/or protection modules is achieved by means of knife-type contacts.

Advantageously, as a result, it is very simple to implement.

Also preferably, the channels in each of the guide plates are rectilinear over their entire lengths, being delimited by parallel partitions, are of different lengths, going from the shortest to the longest in succession, all opening out into a common trough which slants relative to said partitions.

In other words, in accordance with the invention, each channel has no bends.

Advantageously, as a result, the link wires are very easy to install, in particular when, after a first pair of link wires, a second pair is to be inserted.

In accordance with another additional characteristic of the invention, all the channels are covered with a common closing panel which has a sloping edge extending along the edge of the trough into which the channels open out.

Once the link wires are installed and duly connected to the output connector in question, the link wires bear against the sloping edge of the closing panel.

The link wires then leave the channels underlying the panel completely free, thereby making it possible to insert new link wires if desired.

DESCRIPTION OF THE DRAWINGS

The characteristics and advantages of the invention will appear on reading the following description given by way of example and with reference to the accompanying drawings, in which:

FIG. 1 is a perspective view of a telephone distribution frame element, seen from the front;

FIG. 2 is an exploded perspective view thereof, with one of the filtering and/or protection modules that it includes being shown set slightly forward from the others;

FIG. 3 is an exploded perspective view, seen from the rear, of the connector-containing portion of the telephone distribution frame element;

FIG. 4 is an enlarged view of the detail that is referenced IV in FIG. 2, and that relates to the filtering and/or protection module which is shown set slightly forward therein;

FIG. 5 is a view on a still larger scale and in cross-section on the line V—V shown in FIG. 2 through one of the rows of connectors contained in the telephone distribution frame element of the invention;

FIG. 6 is a fragmentary elevation view in the direction of arrow VI shown in FIG. 5 of the row of connectors, after removal of the cap that is associated therewith and at the rear thereof;

FIG. 7 is a fragmentary end view seen in the direction of arrow VII shown in FIG. 6;

FIG. 8 is a fragmentary perspective view on a still larger scale of a connection terminal of the connectors;

FIG. 9 is an elevation view on the line IX—IX shown in FIG. 2 of one of the guide plates contained by the telephone distribution frame element of the invention;

FIG. 10 is an end view of the guide plate, seen in the direction of arrow X shown in FIG. 9;

FIGS. 11 and 12 are views in longitudinal cross-section through the guide plate respectively on line XI—XI and on line XII—XII shown in FIG. 9;

FIG. 13 is a locally cut-away view in cross-section through a telephone distribution frame element of the invention, on line XIII—XIII in FIG. 1;

FIG. 14 is a similarly locally cut-away fragmentary elevation view of the same element, seen in the direction of arrow XIV shown in FIG. 13;

FIG. 15 is another elevation view of the element seen from the inside and in the direction of arrow XV shown in FIG. 14;

FIGS. 16 and 17 are fragmentary elevation views of respective portions of FIG. 6, showing two possible ways of using the connectors contained in the telephone distribution frame element of the invention;

FIG. 18 is a cross-sectional view which is substantially analogous to the view shown in FIG. 5, and which relates to a variant embodiment; and FIG. 19 is a plan view which corresponds substantially to a cross-sectional view of the type shown in FIGS. 5 and 18, and which relates to another variant embodiment.

DESCRIPTION OF THE PREFERRED EMBODIMENTS

By way of example, the figures show how the invention is applied when the telephone distribution frame element 10 in question is to constitute a connection strip.

Normally, the essential function of the telephone distribution frame element 10 is to connect incoming wires 11E, forming the cable connecting the assembly to the automatic exchange, to link wires 11S commonly referred to as "jumpers", coming from the associated cable heads.

Overall, and in a manner known per se, the telephone distribution frame element 10 includes a plurality of connectors 14E, 14S inside a housing 12 which is described in more detail below, each of the connectors in turn having at least one connection terminal 15, namely input connectors 14E for connection to the incoming wires 11E, and output connectors 14S, aligned respectively with said input connectors 14E, for connection to the link wires 11S.

In a manner that is also known per se, and in a layout described in more detail below, channels 16 for guiding the link wires 11S are associated with the output connectors 14S.

Finally, in a manner that is also known per se, at least one filtering and/or protection module 17 for the cable heads is provided in the telephone distribution frame element, which module carries at lest one arbitrary filtering and/or protection component 18, which, since it does not come under the present invention, will not be described in any further detail below.

In practice, the connectors 14E, 14S are disposed in mutually parallel rows 20, with the output connectors 14S being situated towards the front, and the input connectors 14E being situated towards the rear.

In accordance with the invention, the channels 16 associated with the output connectors 14S in the same row 20 are grouped together in a guide plate 21 which extends on edge in alignment with the row 20, and each of the rows 20 of connectors 14E, 14S aligned in this way with respective guide plates 21 is flanked on one side by a passage 22 in which a filtering and/or protection module 17 may extend.

In practice, the passages 22 flanking the rows 20 of connectors 14E, 14S extend continuously over the entire lengths of the guide plates 21 aligned therewith.

In the embodiment that is shown more specifically in FIGS. 1 to 17, the housing 12 includes firstly a cage 24 in which the rows 20 of connectors 14E, 14S are installed transversely from one longitudinal edge 25 of the cage to the other, and secondly a support 26 which is secured to the cage 24, to the rear thereof, and in which the guide plates 21 are installed transversely from one longitudinal wall 27 of the support to the other.

When, as indicated, the element is more specifically a connection strip, the support 26 constitutes a cabinet body which, in addition to its longitudinal walls 27 and two transverse walls 28, includes a back 30 on the side furthest away from the cage 24, the body abutting against the cage 24 via the opening in the body and being secured appropriately to the cage.

For example the cage and body can be secured by clip-fastening and snap-fastening means, as shown.

Since such means are well-known to a person skilled in the art, and can include many variant embodiments, they are not described below.

Suffice to say that, on one of its longitudinal walls 27, the support 26 is provided with mutually parallel cutouts 31 suitable for receiving guide plates 21, and that, on the opposite longitudinal wall 27, the support is also provided with cutouts 32 suitable for snap-fastening the guide plates 21.

In practice, the rows 20 of connectors 14E, 14S are disposed in pairs, with one passage 22 for a filtering and/or protection module 17 on each side of each of the pairs, and a gap 33 between the two rows 20 in each pair.

The guide plates 21 are therefore also disposed in pairs.

In the embodiment shown, there are thus four pairs comprising eight rows 20 of connectors 14E, 14S, and eight guide plates 21.

In this embodiment, there are also eight filtering and/or protection modules 17, comprising six intermediate modules disposed in pairs, and two isolated end modules, the corresponding passages 22 extending between the end pairs of rows 20 of connectors 14E, 14S, and the corresponding transverse edges 34 of the cage 24.

The support 26 is also provided with four cutouts 31 and four cutouts 32.

In the embodiment shown, the filtering and/or protection modules 17 and the rows 20 of connectors 14E, 14S are slidably mounted in parallel slideways 35.

In practice, in the embodiment shown, the slideways 35, which are also disposed in pairs, are clip-fastened to the longitudinal edges 25 of the cage 24.

In any event, in this embodiment, the filtering and/or protection modules 17, and the guide plates 21 form respective drawers which are movable in mutually orthogonal directions for the purposes of installing or removing them.

In the embodiment shown more specifically in FIGS. 1 to 17, the input connectors 14E in the same row 20 and the corresponding output connectors 14S, i.e. the output connectors 14S in the same row 20 are disposed in association in the same casing 36 that is common to the row 20.

The casing is a body made of an insulating material, which body has respective ribs 38 both on its top portion and on its bottom portion so that they can be slidably engaged in slideways 35 (FIGS. 13 and 14), the body having mutually parallel grooves 40 over its entire height, which grooves are suitable for receiving the connectors 14E, 14S.

The connectors 14E, 14S are omitted in FIGS. 13 and 14 to make the figures clearer.

However, they can be seen in FIGS. 5, 6, and 7.

In practice, in the embodiment shown, each of the input connectors 14E has only one connection terminal 15 which is open to the corresponding passage 22 and set slightly back therefrom, while each of the output connectors 14S has two connection terminals 15 back-to-back in this embodiment, one of which is also open to the passage 22 and set slightly back therefrom, and the other one of which is open to the gap 33 opposite from the passage 22 and projects into said gap 33.

In the embodiment shown, all the connection terminals 15 are insulation-displacement terminals.

For example, each connection terminal is part of the sheet constituting the corresponding connector 14E, 14S, and, in two slanting segments of the sheet (as shown in FIG. 8), the connection terminal is provided with two respective slots 42 suitable for receiving an arbitrary wire 11E, 11S, with the insulating sheath thereof being displaced.

Each connection terminal 15 on each of the connectors 14E, 14S is electrically connected to a contact tab 44E, 44S which projects transversely towards the corresponding passage 22, and each of the filtering and/or protection modules 17 is in turn provided with a corresponding transversely-projecting contact tab 45E, 45S for each of the connectors 14E, 14S, which contact tab is suitable for making contact with the contact tab 44E, 44S on the connector.

The contact tabs 44E, 44S on the connectors 14E, 14S are curved, while the contact tabs 45E, 45S on the filtering and/or protection modules 17 are straight.

In practice, each of the contact tabs 44E, 44S on the connectors 14E, 14S extends in one piece from an elastically-deformable blade 46E, 46S which, in turn, extends in one piece from the corresponding connection terminal 15, and is part of the same sheet as the terminal.

The contact tabs 44E, 44S form side extensions on the elastically-deformable blades 46E, 46E, each contact projecting relative to one of the longitudinal edges of the corresponding blade, and, at rest, the elastically-deformable blade 46E of any input connector 14E is in contact with the contact tab 44S of the corresponding output connector 14S (FIG. 6).

Since, as indicated, the element is more specifically a connection strip, a cap 48 is provided to the rear of the input connectors 14E between the row 20 in question and the corresponding guide plate 21, the cap co-operating with the row to delimit a channel 49 suitable for guiding the incoming wires 11E.

In practice, the cap 48 (omitted in FIG. 13) is engaged or snap-fastened on the rear edge of the casing 36 of the row 20 in question (FIG. 5).

Furthermore, a duct 50 runs along the bases of the rows 20 of connectors 14E, 14S, which duct extends transversely relative to the rows 20, and projects from the corresponding longitudinal edge 25 of the cage 24, outside of the cage 24. All of the channels 49 at the rear of the input connectors 14E open out into the duct.

Each of the filtering and/or protection modules 17 includes a support card 52 having longitudinal edges which are thickened to form ribs suitable for sliding the card in slideways 35 in the cage 24.

A block 54 made of an insulating material and from which the contact tabs 45E, 45S project is attached to the front of the support card 52, and the various relevant filtering and/or protection components 18 are attached to the rear of the support card and protected by a cap 55.

In practice, each of the contact tabs 45E, 45S is formed by the end of a metal blade 56E, 56S intersecting a socket 57E, 57S. For the purposes of optionally inserting an arbitrary test pin 58E, 58S so that it can be put into contact with such a blade 56E, 56S, (as shown by dashed lines in FIG. 5), the socket 57E, 57S opens out in the front in a test field, which is thus advantageously easily accessible to the operator.

For example, the link circuits required between the blades 56E, 56S and the various relevant filtering and/or protection components 18 may be provided on the back of the support card 52 by using conventional techniques.

In any event, the contact tabs 45E, 45S extend in rows over the height of the block 54 made of insulating material, and a ground contact 58 may be provided on either one or both of the edges thereof (FIG. 4).

The contact tabs 45E, 45S are optionally offset transversely relative to the main portion of the blades 56E, 56S whose ends they form, instead of being in alignment therewith.

The channels 16 in each of the guide plates 21 are rectilinear over their entire lengths, and are delimited by parallel partitions 60. The channels are of different lengths, going from the shortest to the longest in succession, and, in accordance with the invention, they all open out into a common trough 61 which slants relative to the partitions 60.

In practice, the channels 16 are covered with a closing panel 62 which is common to all the channels and which is parallel to that wall 63 of the guide plate 21 which defines the bottoms of the channels, the panel being disposed substantially half-way across the thickness of the guide plate 21.

Along the entrances of the channels 16, the edge 64 of the closing panel 62 is straight, level with the corresponding edge of the guide plate 21.

Along the trough 61 in which the channels 16 open out, the edge 65 of the panel slopes to a similar extent as the trough 61.

The overall outline of the closing panel 62 as seen from above is therefore triangular.

Preferably, and as shown, the partitions 60 delimiting the channels 16 are extended into the trough 61 beyond the sloping edge 65 of the closing panel 62, the height of the partitions tapering as they extend away from the panel.

In other words, each partition 60 comes to a point as it extends into the trough 61.

In practice, the trough 61 is itself delimited by a partition 66 which runs at a slant over a portion of the height of the guide plate 21.

At its base, each of the guide plates 21 is provided with an elastically-deformable catch 68 for snap-fastening it to the housing 12, and more precisely to the support 26 of the housing 12 by means of a cutout 32 in the support 26.

As indicated above, the guide plates 21 are associated in pairs.

Because their respective closing panels 62 are set back, the two guide plates 21 in the same pair co-operate to define a gap 69 through which the outgoing wires 11S can pass when they leave the channels 16 (as shown for one such wire in FIG. 13), which gap is in alignment with the gap 33 between the two corresponding rows of connectors 14E, 14S.

As shown in FIG. 1 by an arrow F1 for one of the outgoing wires, each outgoing wire 11S is inserted from the outside into one of the channels 16 from the straight edge 64 of the closing panel 62.

When the outgoing wire 11S passes into the trough 61, it is diverted thereby towards the front, firstly via the corresponding gap 69, and then via the gap 33 aligned therewith.

Then, by merely pulling the outgoing wire 11S from the front in the direction of arrow F2 shown in FIG. 13, said outgoing wire can be guided by the pointed end of the corresponding partition 60 of the channel 16 in which it is engaged, so as to be wedged against the sloping edge 65 of the closing panel 62, when the partition 60 is connected to the closing panel.

The operator then merely has to connect the outgoing wire 11S to that one of the connection terminals 15 of the relevant output connector 14S which opens out into the gap 33.

The incoming wires 11E are previously individually connected to the respective connection terminals 15 of the input connectors 14E.

When the filtering and/or protection modules 17 are installed, the contact tabs 45E, 45S of the filtering and/or protection modules 17 are engaged with the respective contact tabs 44E, 44S of the input connectors 14E and of the output connectors 14S, by moving apart the elastically-deformable blades 46E, 46S of the connectors (FIG. 16).

The filtering and/or protection components 18 of the modules then find themselves inserted between the input connectors 14E and the output connectors 14S.

In a variant (FIG. 17), a parallel connection is possible.

To achieve this, for two connectors, namely an input connector 14E and the corresponding output connector 14S, the filtering and/or protection module 17 is provided with only one contact 45, as shown in FIG. 17.

In an analogous layout, one tab made of an insulating material may be interposed in this way between the contact tabs 44E, 44S of an input connector 14E and of an output connector 14S, for the purposes of breaking electrical contact between them.

In the variant embodiment shown in FIG. 18, the input connectors 14E in the same row 20 are disposed in one casing 36E, and the corresponding output connectors 14S are disposed in another casing 36S.

But, as above, they remain substantially adjacent.

The same does not apply in the variant embodiment shown in FIG. 19.

In this variant embodiment, the input connectors 14E and the output connectors 14S in the same row 20 are disposed on either side of the corresponding guide plate 21, in alignment therewith.

Therefore, it is as if the row 20 were merely split into two half-rows 20', 20".

The contact tabs 45E, 45S of the filtering and/or protection modules 17 then extend together on either side of their filtering and/or protection components 18.

The present invention is not limited to the embodiments described and shown, but rather it covers any variant implementation and/or combination of their various elements, in particular with respect to the housing.

For example, the portion of the housing that forms the support for the guide plates may be simplified, e.g. by it being reduced to two parallel end-plates, instead of it constituting a cabinet.

Furthermore, when the input connectors and the output connectors are disposed on either side of the guide plates, the housing is adapted accordingly.

Instead of being mounted in slideways, the connectors may be fixed by screws, and the screws may also be used for position setting.

Instead of being insulation-displacing, the connection terminals of the connectors may also be of the wire-wrap type.

Furthermore, the present invention applies both to cable heads and to connection strips.

In the case of cable heads, however, the incoming wires from the subscriber cables arrive from the rear and run up parallel to the link wires.

I claim:

1. A telephone distribution frame element, of the type including firstly a plurality of connectors (14E, 14S) disposed in rows (20), each connector having at least one connection terminal (15), namely input connectors (14E) for connection to incoming wires (11E), and output connectors (14S), aligned respectively with said input connectors (14E), for connection to link wires (11S), and secondly at least one filtering and/or protection module (17) carrying at least one arbitrary filtering and/or protection component (18) to be inserted between the connection terminal (15) of an input connector (14E) and the connection terminal (15) of the corresponding output connector (14S), with channels (16) suitable for guiding the link wires (11S) being associated with the output connectors (14S), said element being characterized in that the channels (16) associated with the output connectors (14S) in the same row (20) are grouped together inside a guide plate (21) which extends on edge and in alignment with the row (20), and in that each of the rows (20) of connectors (14E, 14S) aligned in this way with the guide plates (21) is flanked on one side by a passage (22) in which a filtering and/or protection module (17) can extend.

2. A telephone distribution frame element according to claim 1, characterized in that the passage (22) flanking a row (20) of connectors (14E, 14S) extends continuously over the guide plate (21) that is aligned with the row.

3. A telephone distribution frame element according to claim 1, characterized in that the connection terminal (15) on each of the connectors (14E, 14S) is electrically connected to a contact tab (44E, 44S) which projects transversely towards the corresponding passage (22), and the filtering and/or protection module (17) is in turn provided with a corresponding transversely-projecting contact tab (45E, 45S) for each of the connectors (14E, 14S), which contact tab is suitable for making contact with the contact tab (44E, 44S) on the connector.

4. A telephone distribution frame element according to claim 3, characterized in that each of the contact tabs (45E, 45S) on the filtering and/or protection module (17) is formed by the end of a metal blade (56E, 56S) intersecting a socket (57E, 57S), and, for the purposes of optionally inserting an arbitrary test pin (58E, 58S) so that it can be put into contact with such a blade (56E, 56S), the socket (57E, 57S) opens out in the front.

5. A telephone distribution frame element according to claim 3, characterized in that the contact tab (44E, 44S) on each connector (14E, 14S) is made in one piece with an elastically-deformable blade (46E, 46S), and, at rest, the elastically-deformable blade (46E) of each input connector (14E) is in contact with the elastically-deformable blade (46S) of the corresponding output connector (14S).

6. A telephone distribution frame element according to claim 5, characterized in that the input connectors (14E) in the same row (20) and the corresponding output connectors (14S) are disposed together in the same casing (36).

7. A telephone distribution frame element according to claim 1, characterized in that the input connectors (14E) in the same row (20) are disposed in one casing (36E), and the corresponding output connectors (14S) are disposed in another casing (36S).

8. A telephone distribution frame element according to claim 7, characterized in that the input connectors (14E) and the output connectors (14S) in the same row (20) are disposed on either side of the corresponding guide plate (21).

9. A telephone distribution frame element according to claim 1, characterized in that the channels (16) in each of the guide plates (21) are rectilinear over their entire lengths, being delimited by parallel partitions (60), are of different lengths, going from the shortest to the longest in succession, all opening out into a common trough (61) which slants relative to said partitions (60), and all covered with a common closing panel (62) which has a sloping edge (65) extending along the edge of the trough (61) into which the channels open out.

10. A telephone distribution frame element according to claim 1, characterized in that the rows (20) of connectors (14E, 14S) are disposed in pairs, with one passage (22) for a filtering and/or protection module (17) on either side of each pair, and a gap (33) between the two rows (20) in each pair.

11. A telephone distribution frame element according to claim 10, characterized in that the connection terminal (15) on each of the input connectors (14E) is open to the passage (22) and is set slightly back therefrom, and each of the output connectors (14S) includes at least one connection terminal (15) which is open to the gap (33) and which projects into said gap.

12. A telephone distribution frame element according to claim 1, characterized in that, when it is a connection strip, a cap (48) is provided to the rear of the input connectors (14E) in each of the rows (20), between the row (20) in question and the corresponding guide plate (21), to delimit a channel (49) suitable for guiding the incoming wires (11E).

13. A telephone distribution frame element according to claim 12, characterized in that a duct (50) for the incoming wires (11E) runs along the bases of the rows (20) of connectors (14E, 14S), which duct extends transversely relative to the rows (20), and all the channels (49) at the rear of the input connectors (14E) open out into the duct.

14. A telephone distribution frame element according to claims 1, characterized in that its housing (12) includes a cage (24) in which the rows (20) of connectors (14E, 14S) are installed, and a support (26) which is secured to said cage (24) to the rear thereof, and in which the guide plates (21) are installed.

15. A telephone distribution frame element according to claim 14, characterized in that said support (26) constitutes a cabinet body which abuts against the cage (24) via the opening in the body and is associated therewith, and which has cutouts (31) in one of its walls (27), which cutouts are suitable for receiving the guide plates (21).

* * * * *